Oct. 14, 1969   J. C. JUREIT   3,472,118
HIDDEN FASTENER
Filed Nov. 13, 1967

INVENTOR
JOHN C. JUREIT

BY *LeBlanc & Shur*

ATTORNEYS

United States Patent Office 3,472,118
Patented Oct. 14, 1969

3,472,118
HIDDEN FASTENER
John C. Jureit, Coral Gables, Fla., assignor to Automated Building Components, Inc., Miami, Fla., a corporation of Florida
Filed Nov. 13, 1967, Ser. No. 682,223
Int. Cl. F16b 15/00
U.S. Cl. 85—13                         1 Claim

ABSTRACT OF THE DISCLOSURE

The hidden fastener comprises a strip of sheet metal having two groups of nail-like teeth struck therefrom to extend normal to and from opposite sides of the strip. The teeth of each group are equally spaced one from the other, and one group comprises a pair of scarfed end nail-like teeth struck about axes transverse to the longitudinal axis of the strip such that the teeth lie in back-to-back relation and the openings left thereby in the strip extend in opposite directions from the teeth. These teeth provide a lateral clinching action when driven into a stud. The other group comprises three nail-like type teeth struck about axes transversely of the longitudinal axis of the strip and forming an isosceles triangular configuration, the openings left in the strip formed by the teeth comprising the base of the triangle extending from such teeth in a direction opposite to the opening formed in the strip left by the third tooth. The tips of the base teeth have scarfed ends for lateral clinching action and the third tooth is beveled for movement away from the base teeth as a wall panel is pressed toward the stud driving the triangularly arranged group of teeth into the panel, thereby securing the panel to the stud and providing a triangular clinching action.

BACKGROUND OF THE INVENTION

This invention relates to connecting devices and more particularly relates to a wall panel tape-like nail of the hidden fastener type for fastening sheathing, wallboard and the like to studding, as well as for providing the wallboard with acoustical absorbing qualities and other uses.

The problem of readily and easily attaching wallboard, paneling and the like to studding in the wooden building construction industry has been an ever present one, even to this date, as can be seen by the fact that nails are still commonly employed for this purpose. Many solutions have been proposed to avoid nailing through paneling and the like into studding, particularly in order to eliminate the problem of covering up exposed nailheads. This problem becomes acute wherein prefinished paneling is employed as it is somewhat expensive and time consuming to cover the nailheads with a spackling material having like texture, color, grain, etc., as the prefinished wall panel. Additionally, to my knowledge, none of these solutions has provided or even suggested a wallboard, panel, or the like having a sound absorbing quality afforded thereto solely by its connection to the studding.

A multitude of prior fasteners, including those of the hidden fastener type, have heretofore been proposed, one of which is disclosed in U.S. Patent No. 3,261,137 dated July 19, 1966, of common inventorship herewith. In this patent, longitudinally spaced groups of three teeth each are struck from a sheet metal plate to extend normal thereto in transverse side-by-side relation, each group alternately extending in opposite directions from the plate whereby a wallboard may be connected to a stud by pressing the wallboard toward the stud, thereby driving the oppositely struck groups of teeth into the stud and wallboard. This has proved to be a very satisfactory type of connection. However, the dies for forming this type of tooth configuration are much more difficult and more expensive to build. Moreover, while the resistance to withdrawal of the tripod teeth of this patent has been found satisfactory in most applications, the clinching action of these tripod teeth acts only in a very limited area of the wallboard, panel or the like.

Additionally, the fastening strip of that patent holds the wallboard firmly against the strip with the strip being rigidly fixed to the studding. It is known that the sound absorpion property of a material is a function of surface porosity and/or dissipative surface vibration. Unless the wallboard per se is specifically constructed to provide a sound absorbing surface which is aesthetically undesirable in the case of wood paneling, it is seen that a wallboard joined to studding by the fastener of the above-noted patent, as well as all other fasteners of this type known to me, cannot provide soundproofing qualities due to the rigidity of the connection thereof with the studding.

SUMMARY OF THE PRESENT INVENTION

The present invention provides a wall panel nail of the hidden fastener type comprising a tape-like strip of thin sheet metal having a plurality of longitudinally spaced groups of nail-like teeth struck therefrom and alternately extending from and lying normal to opposite faces of the strip. The groups of teeth extending from one face of the strip each comprise a pair of teeth struck about axes extending transversely of the longitudinal axis of the strip to lie in back-to-back relation one to the other with the holes left thereby extending from the teeth in opposite directions. V-grooves are formed coextensive in length with the teeth to reinforce the same and the tips of the teeth are scarfed in opposite directions to provide a lateral clinching action when secured to studding.

The other groups of teeth which extend from the opposite face of the strip are likewise struck about transverse axes and project from the opposite face of the strip to form an isosceles triangular tooth configuration. The teeth forming the base of the triangular configuration are struck such that the holes left thereby extend from the teeth in a direction opposite to the direction that the hole left by the third tooth extends from the third tooth such that the base teeth and the third tooth lie in back-to-back spaced relation. The tips of the base teeth are scarfed to provide a lateral outwardly clinching action while the end of the third tooth has a chisel tip. The tip of the third tooth is also bevelel such that, upon driving the wall panel against the three teeth, the panel moves the third tooth in a direction away from the base teeth, thereby providing a spaced triangular clinching action.

To apply the fastener to the studding and the wall panel to the fastener, a carpenter simply successively nails the spaced groups of paired scarf-tipped teeth to the studding for the full length of the strip. Each pair of teeth can usually be embedded with but one hammer blow and it will be noted that the groups of three teeth each are spaced along the tape from the paired teeth groups so as not to interfere with or be peened by such nailing. The carpenter then butts the wall panel against the studding and drives the wall panel toward the studding by means of a mallet, preferably rubber, to embed the triangularly arranged groups of teeth into the back of the wall panel, thereby securing the wall panel to the studding. Due to the unique configuration of the teeth and the relative location of the different groups of teeth along the strip, the present wall panel nail provides not only a secure wall panel to stud connection but also affords a sound-proofing property to the wall panel. By spacing the wall panel to fastener connection from the fastener to studding connection (eliminating a straight-through connection between the wall panel and studding), the wall panel is not rigidly secured to the studding but rather is free to move very slightly outwardly from the studding. The fastener hereof is formed of very thin sheet metal, preferably on the order of 26 U.S. standard gauge, whereby the wall panel is thus free for limited vibration in a direction normal to the studding. The wall panel accordingly derives its sound absorbing property from the limited vibration thereof which dissipates impinging acoustical energy. The resistance to withdrawal of both groups of teeth is sufficiently high such that the wall panel remains fixed to the studding notwithstanding the vibratory sound dissipating action of the wall panel.

Accordingly, it is a primary object of the present invention to provide an improved wall panel nail of the hidden fastener type.

It is another object of the present invention to provide a wall panel nail of the hidden fastener type which may be readily and easily applied to studding and which provides a high withdrawal resistance in both studding and wall paneling.

It is still another object of the present invention to provide an improved wall panel nail in the form of a tape-like strip having nail-like teeth struck therefrom projecting in opposite directions and which may be readily, easily and inexpensively manufactured.

It is a further object of the present invention to provide an improved wall panel nail for connecting wall panel to studding whereby such wall panel is afforded sound absorbing properties.

It is still a further object of the present invention to provide an improved wall panel nail for joining wall paneling to studding wherein the wall paneling is permitted to limitedly vibrate to dissipate acoustical energy.

These and further objects and advantages of the present invention will become more apparent upon reference to the following specification, claims and appended drawings.

DESCRIPTION OF THE DRAWING FIGURES

DESCRIPTION OF THE PREFERRED EMBODIMENT

Figure 1:
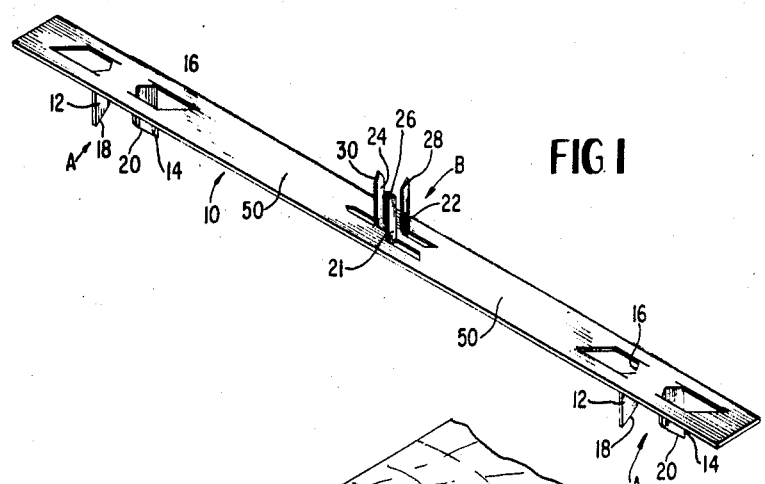
FIGURE 1 is a fragmentary perspective view of a wall panel nail constructed in accordance with the present invention.
Figure 2:
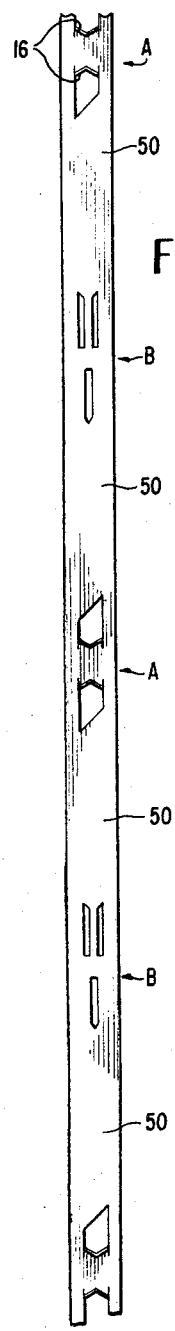
FIGURE 2 is a fragmentary plan view thereof looking at the undersurface of the strip illustrated in FIGURE 1.
Figure 3:
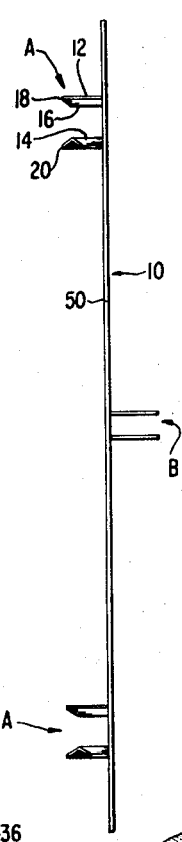
FIGURE 3 is a side elevational view theerof.

Referring to FIGURES 1–3, there is shown a wall panel nail generally indicated 10 comprising an elongated narrow tape-like strip of sheet metal having a plurality of equally spaced groups of nail-like teeth alternately projecting from opposite faces thereof. Groups of like teeth indicated at A project from one face of strip 10 while groups of like teeth of a different type indicated at B project from the opposite face of strip 10. The groups of teeth indicated at A each comprise a pair of teeth 12 and 14 struck about axes extending substantially transversely of the longitudinal axis of strip 10 to project substantially normal to a face of strip 10. Teeth 12 and 14 are struck such that the holes left thereby in strip 10 extend from the respective teeth in opposite directions whereby teeth 12 and 14 are spaced from one another in longitudinally spaced back-to-back relation.

Teeth 12 and 14 are preferably V-shaped in cross section as at 16 throughout their full lengths, whereby the teeth are longitudinally reinforced. Teeth 12 and 14 have scarf-pointed tips 18 and 20, respectively, which extend laterally in opposite directions, the edge of each tooth longer in length than its opposite edge.

The groups of teeth indicated at B each comprise three teeth 20, 22, and 24 struck about axes extending transversely of the longitudinal axis of strip 10 to project substantially normal to the opposite face of strip 10. Teeth 20, 22, and 24 lie in a substantial isosceles triangular configuration looking lengthwise along the teeth. The teeth 20 and 22 forming the base of the triangular configuration are struck such that the holes left thereby in strip 10 extend from the base of teeth 20 and 22 in a direction opposite to the direction that the hole left by the third tooth 24 extends from its base whereby teeth 20 and 22 lie in longitudinally spaced back-to-back relation with tooth 24. As seen in FIGURE 1, base teeth 20 and 22 have scarf-pointed tips 26 and 28 which extend laterally towards opposite sides of strip 10. The end of tooth 24 has a chisel tip as at 30 and it will be seen that teeth 20, 22, and 24 provide an initial three point triangular contact with a wall panel WP as will be described.

It will be understood that strip 10 can be formed to any desired length and a preferred form hereof provides the wall panel nail in tape-like strips of about 2 feet long whereby four strips located in end-to-end relations along a stud for nailing the usual 8 foot high panel thereto are provided as discussed hereafter. Strip 10 is preferably formed of 26 U.S. standard gauge galvanized sheet metal having a nominal thickness of .020 inch with the centers of next adjacent groups of teeth being spaced 3 inches one from the other for reasons as will presently become clear. The tape-like strip is preferably ¼ inch wide. The nail-like teeth forming the teeth of groups A are preferably 5/16 inch in length and ⅛ inch wide, while the teeth forming the teeth of groups B are preferably ⅜ inch long and .035 inch wide. The above-quoted length for the nail-like teeth of groups B is provided where relatively soft wallboard, such as gypsum, is being applied to studding. The nails in this case must have considerable length if their resistance to withdrawal in this type of material is to be within satisfactory limits. For other materials, such as plywood, the length of teeth 20, 22, and 24 can be somewhat shorter and on the order of 3/16 inch. For relatively hard wallboard, such as Masonite, the teeth 20, 22, and 24 can be even shorter.

Figure 6:
FIGURE 6 is a fragmentary perspective view of another form of teeth for use with the wall panel nail.

While teeth 20, 22, and 24, as illustrated, are the preferred form of teeth, other tooth configurations may be employed for particular wall panel applications if desired. For example, spurred triangular teeth 36, as seen in FIGURE 6, are particularly effective in wall panel formed of relatively softer materials, such as Upson board. Accordingly, the teeth groups B may each comprise four triangular-shaped teeth 36 struck to leave a single opening in strip 10, triangular teeth 36 being struck at right angles one to the other and having a spur or recess 40 formed along one edge of each teeth for hooking about the fibers of the softer wallboards.

Figure 7:
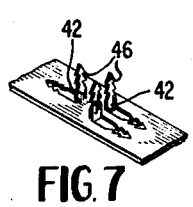
FIGURE 7 is a fragmentary perspective view of a third form of teeth for use with the wall panel nail hereof.

Another type of tooth configuration for the teeth forming teeth groups B provides for barbed teeth 42. These teeth may be formed in a triangular configuration similarly as teeth 20, 22 and 24. As seen in FIGURE 7, both edges of each tooth are undercut along their lengths to provide a series of barbs 46 which extend laterally outwardly of the teeth. These barbed teeth, similarly as the spurred triangular teeth, provide excellent withdrawal characteristics particularly in the softer wallboards.

Figure 4:
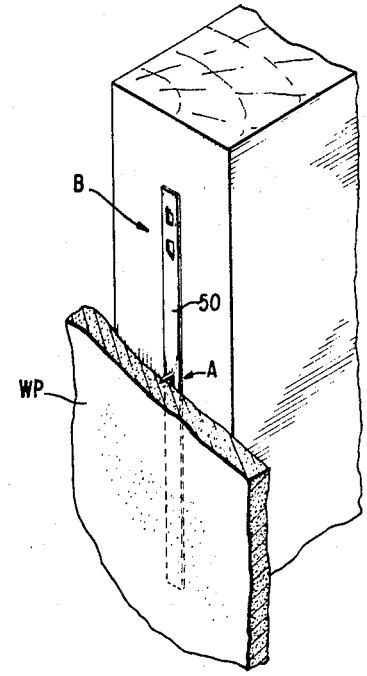
FIGURE 4 is a fragmentary perspective view of the nailing strip connecting a wall panel to studding.

The wall panel nailing strip hereof may be applied at the job site or at a prefabrication assembly site and, in either case, a carpenter would apply the tape-like strip 10 to studding 32, illustrated in FIGURE 4, by successively nailing the teeth 12 and 14 of teeth groups A into the face of the studding on which the wall panel WP will be applied. The carpenter would normally start at the top of stud 32 and nail downwardly locating the 2 foot long nail strips of the preferred embodiment in end-to-end relation along the stud. The scarf points on nails 12 and 14 provide for ready embedment thereof into studding 32 as by a single blow of a hammer and it will be seen that by scarfing nails 12 and 14 laterally opposite in directions, the nails 12 and 14 diverge one from the other to provide a clinching action in studding 32. With the groups of teeth A and B spaced one from the other, preferably on three inch centers, it will be seen that teeth 20, 22 and 24 are spaced from the flat nailing surfaces on the opposite face of strip 10 from teeth 12 and 14 whereby teeth 20, 22 and 24 do not interfere and are not peened over as teeth 12 and 14 are driven into stud 32.

With the strips finally secured coextensively with studding 32, it will be seen that the nail tapes 10 lie flat against the face of stud 32 forming a continuous strip therealong with the teeth groups B projecting outwardly therefrom. The carpenter then applies the wall panel WP against studding 32, driving the wall panel WP toward studding 32 to embed teeth 20, 22 and 24 into the back of wall panel WP. A rubber mallet is preferably used for this purpose, particularly when applying prefinished wall paneling. It is significant that, as wall panel WP is pressed toward studding 32, the scarf-pointed tips 26 and 28 of base teeth 20 and 22 cause the latter to diverge laterally while the beveled tips 30 cause teeth 24 to incline forwardly away from base teeth 20 and 24, thereby providing a triangular clinching action which increases the resistance to withdrawal. The strips 10 employing the barbed or triangular tooth configuration illustrated in FIGURES 6 and 7 may be similarly applied to stud 32 with the wall panel being likewise similarly applied against the strips.

Figure 5:
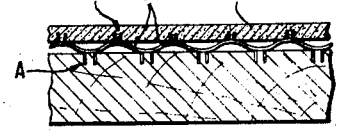
FIGURE 5 is a fragmentary cross sectional view thereof illustrating the wall panel spaced from the studding for vibratory movement.

The foregoing type of wall panel to stud connection provides the wall panel WP with a sound absorbing property by permitting limited vibration of wall panel WP relative to stud 32 whereby acoustical energy is dissipated. As will be seen in FIGURE 5, the longitudinal spacing of the teeth of one group from the teeth of the other group along the strip 10, coupled with the unique configuration thereof providing high resistance to withdrawal from both the wall panel and studding, forms a bridging effect between next adjacent groups of teeth provided by the metal strip portion 50 therebetween. As illustrated, wall panel WP is secured to the groups of teeth B projecting from the outer face of strip 10 which, in turn, is secured to studding 32 solely by the groups of teeth A projecting from the inner face of strip 10. By longitudinally spacing the wall panel to fastener connection provided by the teeth of groups B from the fastener to studding connection provided by the teeth of groups A thereby eliminating a straight-through wall panel to studding connection, the sole connection between the wall panel WP and studding 32 comprises the metal strip portion 50 lying between adjacent groups of teeth A and B. Since strip 10 is tape-like and flexible, the metal portion 50 provides a spring-type or flexible connection permitting limited vibratory movement of wall panel WP relative to studding 32. Wall panel WP can thus move slightly outwardly of the stud 32 to a very limited extent, connected thereto only by spring metal portions 50. Wall panel WP is thus free for limited vibratory movement by flexing action of strip portions 34 whereby panel WP dissipates acoustical energy and thereby provides a quieting or soundproofing action.

It is thus seen that the objects of the present invention are fully accomplished in that there is provided an improved type of hidden fastener for forming lap joints which may be economically formed, readily and easily applied, and which provides the requisite strength characteristics necessary to maintain a wallboard secured to studding. Moreover, the fastener is formed to permit limited vibration of the wall panel relative to the studding for acoustical energy dissipation providing the wall panel connection with a sound absorbing property.

The invention may be embodied in other specific forms without departing from the essential characteristics thereof. The present embodiments are therefore to be considered in all respects as illustrative.

What is claimed and desired to be secured by United States Letters Patent is:

1. A fastener strip for forming lap joints wherein the strip is sandwiched between the members of the joint comprising an elongated narrow tape-like strip of sheet metal, first tooth means comprising plural groups of at least three teeth each, the groups being struck from said strip at longitudinally spaced positions therealong and projecting substantially normal to said strip from one face thereof for embedment into a member of the joint, each group of teeth comprising a pair of teeth struck to project in laterally spaced relation one to the other, a third tooth struck to project from said strip with the slot left thereby in said strip extending longitudinally from said tooth, second tooth means comprising plural groups of two nail-like teeth each, the second groups being struck from said strip at longitudinally spaced positions therealong and projecting substantially normal to said strip from the opposite face thereof for embedment into the opposite member of the joint, said first and second groups of teeth being alternately spaced along said strip with the face portions of said strip lying between next adjacent groups of said second groups of teeth and on the same side of said strip from which said second groups of teeth project being free of protuberances, said two teeth of said second group being struck to extend in back-to-back spaced longitudinal relation one to the other with the slots left thereby extending from the teeth in opposite directions, said two teeth having scarfed points with a lateral edge of each tooth being longer in length than its opposite lateral edge, the lateral edge of one of said two teeth being longer in length than the longitudinally adjacent lateral edge of the other of said two teeth whereby said two teeth incline laterally in opposite directions upon embedment into a joint member to provide a lateral clinching action, said pair of teeth of said first tooth means having scarfed points with the outermost edges of said pair of teeth being longer in length than the innermost edges thereof to provide for lateral outward movement of said pair of teeth upon embedment into the joint member, said third tooth and said pair of teeth forming a triangular tooth pattern, said tooth having a beveled point such that embedment of said third tooth into the joint member causes the third tooth to incline longitudinally away from said pair of teeth whereby said triangularly configured teeth provide a three-way clinching action.

References Cited

UNITED STATES PATENTS

| | | | |
|---|---|---|---|
| 1,089,878 | 3/1914 | Steinhauser | 85—14 |
| 1,324,483 | 12/1919 | Upson | 85—14 |
| 3,011,226 | 12/1961 | Menge | 287—20.92 |
| 3,090,088 | 5/1963 | Foley et al. | 85—13 X |
| 3,261,137 | 7/1966 | Jureit | 52—482 |

FRANK L. ABBOTT, Primary Examiner

PRICE C. FAW, Jr., Assistant Examiner

U.S. Cl. X.R.

152—362, 483; 287—20.92